US010331333B2

(12) United States Patent
Dowd et al.

(10) Patent No.: US 10,331,333 B2
(45) Date of Patent: Jun. 25, 2019

(54) TOUCH DIGITAL RULER

(71) Applicant: ADOBE INC., San Jose, CA (US)

(72) Inventors: Geoffrey Charles Dowd, San Francisco, CA (US); Arian Behzadi, San Francisco, CA (US); Gregory Cy Muscolino, Novato, CA (US)

(73) Assignee: Adobe Inc., San Jose, CA (US)

( * ) Notice: Subject to any disclaimer, the term of this patent is extended or adjusted under 35 U.S.C. 154(b) by 374 days.

(21) Appl. No.: 14/463,639

(22) Filed: Aug. 19, 2014

(65) Prior Publication Data

US 2016/0054893 A1 Feb. 25, 2016

(51) Int. Cl.

*G06F 3/048* (2013.01)
*G06F 3/0488* (2013.01)
*G06F 3/0481* (2013.01)
*G06F 3/0484* (2013.01)

(52) U.S. Cl.

CPC ........ *G06F 3/04883* (2013.01); *G06F 3/0481* (2013.01); *G06F 3/04845* (2013.01)

(58) Field of Classification Search

CPC .......................... G06F 3/04883; G06F 3/0481; G06F 3/04845

See application file for complete search history.

(56) References Cited

U.S. PATENT DOCUMENTS 8,487,889 B2 7/2013 King
2011/0078597 A1* 3/2011 Rapp .................. G06F 3/04845 715/765
2011/0175821 A1* 7/2011 King .................. G06F 3/04883 345/173
2012/0210261 A1* 8/2012 Sarnoff ............... G06F 3/04845 715/765
2014/0047413 A1* 2/2014 Sheive .................. H04L 65/403 717/110

* cited by examiner

*Primary Examiner* — Anil N Kumar
(74) *Attorney, Agent, or Firm* — Shook, Hardy & Bacon L.L.P.

(57) ABSTRACT

Embodiments of the present invention provide systems, methods, and computer storage media directed to a touch digital ruler. As such, a particular drawing stroke on a canvas or background can be drawn in alignment with a template irrespective of whether a touch path input by a user aligns with the template. In some implementations, a drawing stroke is aligned with a template edge when the touch digital ruler has been activated despite the location of a user's motion on a touchscreen display.

20 Claims, 11 Drawing Sheets

TOUCH DIGITAL RULER

BACKGROUND

Some drawing services, such as the ADOBE LINE and ADOBE SKETCH, have been developed that provide mechanisms for users to generate drawings or sketches in an electronic format. Many electronic drawing services enable a user to generate drawing strokes in a free-form manner. For example, a user can move a finger or stylus over a canvas or background via a drawing application running on a touchscreen device to draw a line, curve, polygon, or any object. Drawing a straight line or a shape in a precise or symmetrical manner, however, can be difficult, particularly using an application running on a touchscreen display.

SUMMARY

Embodiments of the present invention relate to a digital ruler that enables drawing lines or strokes in a precise manner. In this way, a user can utilize a digital ruler to draw straight lines or other predefined shapes on a canvas. In some implementations, a template is manipulated to position a template edge(s) on a background such that the user can utilize the template edge(s) to draw a straight or otherwise precise stroke. Upon the template being positioned in a desirable location, as a user applies a stroke path (e.g., touch motion on a touchscreen display), a drawing stroke is generated and presented along the template edge. That is, a drawing stroke is provided that aligns with or abuts the template edge even though the stroke path may be separate or removed from the template edge (e.g., either partially or entirely). For example, when a user applies a touch motion that traverses the touchscreen display within proximity to a template edge, but does not necessarily touch the template edge, a corresponding drawing stroke is presented along the template edge to effectuate a precise stroke desired by the user.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
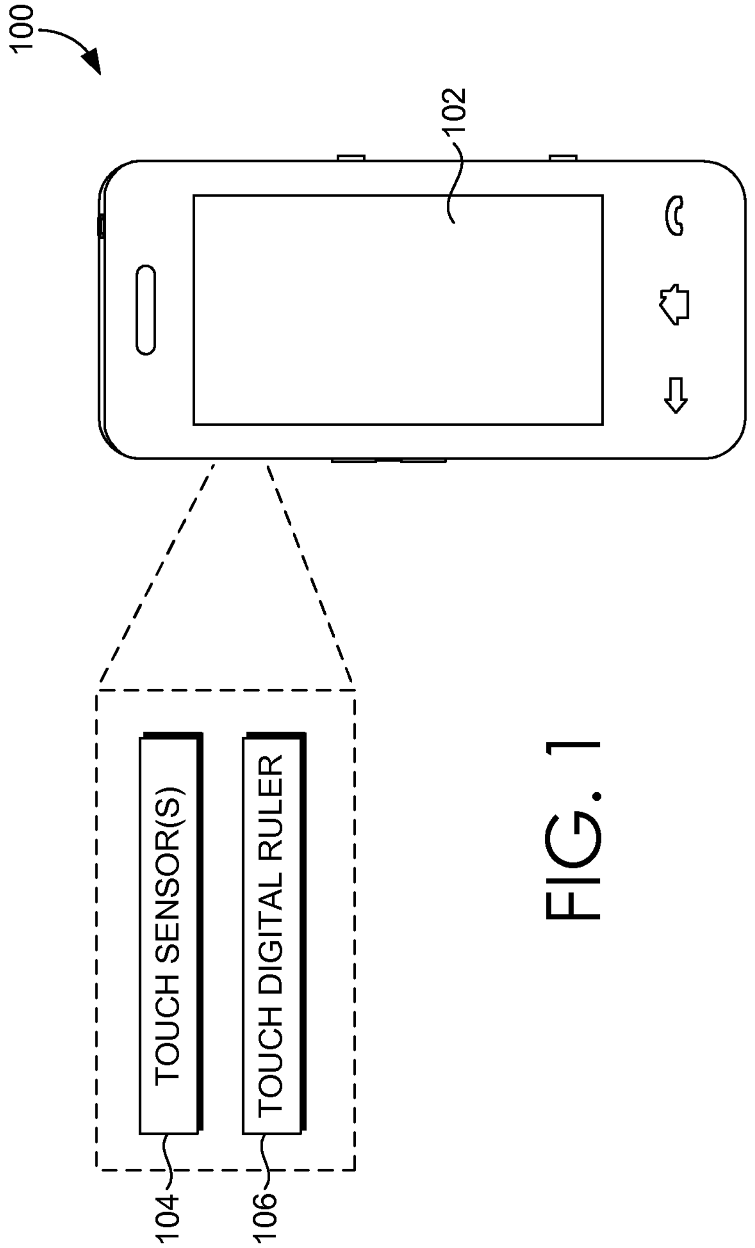
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms “step” and/or “block” may be used herein to connote different elements of methods employed, the terms should not be interpreted as implying any particular order among or between various steps herein disclosed unless and except when the order of individual steps is explicitly described.

Some drawing services, such as the ADOBE LINE and ADOBE SKETCH, have been developed that provide mechanisms for users to generate drawings or sketches in an electronic format. Oftentimes, however, drawing strokes generated by a user within a drawing application do not turn out as intended by a user as the drawing stroke is not as precise as desired by the user. For example, assume that a user wishes to draw a straight line. Although a user may move his or her finger in a generally straight line on a touchscreen display, variations in motion and/or a slant of the motion can result in a drawn line that is not as straight as desired by the user. Some hardware rulers, such as the ADOBE SLIDE, have been developed for use as a digital ruler to facilitate drawing straight lines or other precise shapes within drawing applications. To this end, a user can place a hardware ruler over a touchscreen display to draw straight lines on a canvas or background. Some users, however, may not have access to such a hardware digital ruler making it difficult to create precise drawing strokes.

Embodiments of the present invention are directed to facilitating drawing strokes with precision utilizing a touch digital ruler. In this regard, a user can effectuate straight lines or other precise shapes when the touch digital ruler is activated. In accordance with implementations described herein, the user can specify a particular template to utilize for drawing a specific line or shape. A template may be of any shape, size, or form including, for example, a line, polygon, or other predefined shape. Upon positioning the template over the canvas or background in a manner designated by the user, a drawing stroke that aligns with a template edge can be initiated by providing a touch input (e.g., using a finger or stylus) in a vicinity thereof. That is, a user can provide a touch input or motion that is near an edge of the designated template (or otherwise on a touchscreen display) to draw a stroke that precisely aligns with the template edge. As can be appreciated, the stroke drawn on the canvas aligns with the template edge to generate a precise drawing stroke (e.g., a straight line) without the user being required to input a stroke path (e.g., via a finger or stylus) in such a precise manner.

Figure 8:
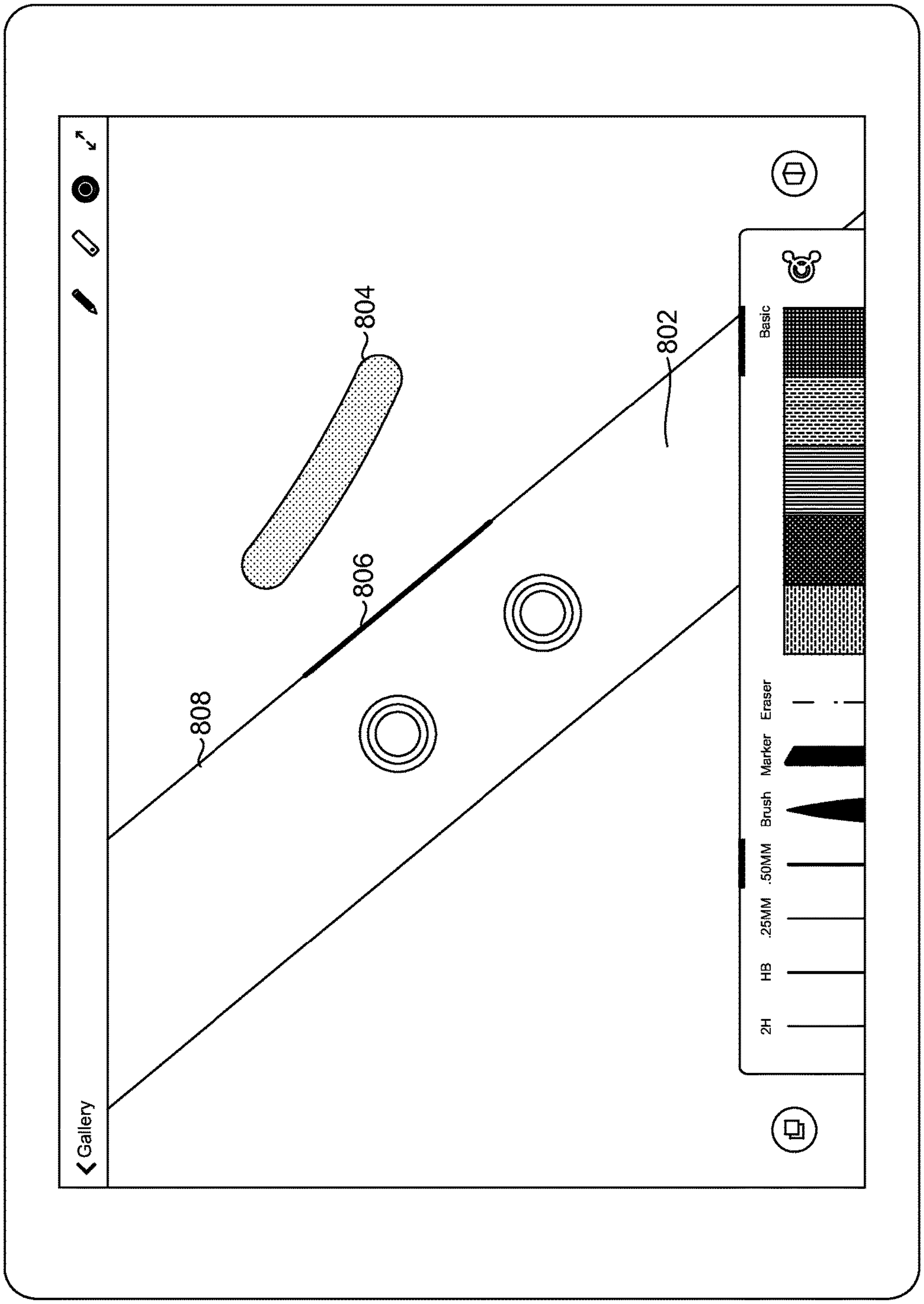
FIG. 8 is an exemplary graphical user interface illustrating a drawing stroke aligned with a template based on a stroke path, in accordance with embodiments of the present invention.

By way of example, and with reference to FIG. 8, assume that a particular template 802 is initiated via a touch digital ruler. Further assume that a user moves a finger or stylus along a stroke path 804 that is generally positioned near an edge 806 of the template 802. In accordance with embodiments of the present invention, although the stroke path 804 does not fall precisely on the template edge 806, as the user moves his or her finger in a motion along the stroke path 804, a drawing stroke 808 aligning with or contouring the template edge 806 is generated. That is, the drawing stroke 808 is formed in a straight line at a particular position even though the touch motion or stroke path may be irregular, that is, does not precisely form a straight line.

Although the description provided herein is generally directed to a touch digital ruler within a drawing application or service, as can be appreciated, the touch digital ruler described herein could be used in association with other types of applications or services, such as photo editing applications, electronic documents, or the like. As such, in addition to a drawing environment, the touch digital ruler may be implemented in any number of environments including any non-drawing environment such as, for example, images, web content, text, photographs, documents, or the like.

In accordance with embodiments of the present invention, FIG. 1 illustrates an exemplary computing device 100 that is utilized to implement a touch digital ruler. The computing device 100 can be any device associated with a display screen 102, such as the computing device 1200 of FIG. 12. The display screen 102 is a screen or monitor that can visually present, display, or output information, such as, for example, drawings, sketches, images, text, figures, values, symbols, videos, video clips, movies, photographs, lists, data sets, webpages, emails, text messages, notifications, or any other content. In some embodiments, the computing device 100 is a portable or mobile device, such as a mobile phone, a personal digital assistant (PDA), a video player, a laptop, or any other portable device associated with a display screen. In some implementations, the computing device 100, such as a portable device, includes the display screen 102. That is, a display screen is integrated or coupled with the portable device. In other implementations, a display screen is remote from, but in communication with, the computing device.

The display screen 102 may be a touchscreen display, in accordance with embodiments described herein. A touchscreen display enables detection of location of touches or contact within a display area. In this regard, a touchscreen display refers to a display screen to which a user can provide input or interact therewith by making physical contact or near contact with the display screen. An illustrative example includes a user utilizing his or her finger to tap or move, or use some other form of touch action, to interact with a user device. Other items, such as a stylus, fingernail, etc., may be used to provide input to the device by way of touchscreen display. As such, a touchscreen display can be used as an input component irrespective of whether a keyboard or mouse is used as an input component for interacting with displayed content. Touchscreen displays can be implemented using any of a variety of touchscreen technologies. By way of example, and not limitation, a touchscreen display might be based on various touchscreen technologies such as resistive, surface-acoustic wave, capacitive, infrared, optical imaging, dispersive signal technology, acoustic pulse recognition, and other technologies known in the art.

As shown in FIG. 1, the exemplary computing device 100 includes a touch sensor(s) 104. A touch sensor(s) 104 may be any touch sensor(s) that detects contact or touch of an object with the touchscreen display 102 of the computing device 100. Such an object may be, for example, a user digit (e.g., a finger), a stylus, or another component that contacts a touchscreen display. A touch sensor(s) 104 may be any sensor suitable to detect an indication of touch, such as, for example, a capacitive sensor or a resistive sensor. As can be appreciated, any number of touch sensors may be utilized to detect contact with a touchscreen display.

In operation, a touch sensor detects contact of an object with at least a portion of a touchscreen display 102 of the computing device 100. A touch sensor may generate a signal based on contact with at least a portion of the touchscreen display 102 associated with the computing device 100. The signal generated by the touch sensor(s) may be communicated (e.g., directly or indirectly) to the touch digital ruler 106, or other component, such that the touch digital ruler 106 can facilitate drawing a precise stroke or set of strokes.

In one embodiment, the touch sensor(s) 104 may be calibrated to generate a signal or communicate the signal upon exceeding a certain threshold generally accepted as being representative of sufficient contact. For example, in an instance when a touch sensor(s) 104 measures a certain threshold temperature or conductivity, the touch sensor(s) 104 may generate a signal and communicate the signal to the touch digital ruler 106. On the other hand, when the touch sensor(s) 104 does not measure the certain threshold temperature or conductivity, the touch sensor(s) 104 may fail to generate the signal or communicate the signal to the touch digital ruler 106. The touch sensor(s) 104 may be configured to generate signals based on direct human touch or touch using another object (e.g., a stylus, etc.). As can be appreciated, the sensitivity of the touch sensor(s) 104 implemented into the device 100 can affect when contact is registered or detected.

As described, the touch sensor(s) 104 transmits signals to the touch digital ruler 106 to indicate contact with the touchscreen display 102. The touch digital ruler 106 is generally configured to facilitate generating a precise drawing stroke or set of strokes. As such, upon referencing signals indicating a touch event or gesture in connection with the touchscreen display 102, the touch digital ruler 106 can utilize such data to identify a manner in which to draw one or more drawing strokes and, thereafter, initiate drawing of the appropriate stroke(s). In some cases, the touch digital ruler 106 is part of an application that performs the drawing functionality. For example, the touch digital ruler 106 might perform drawing functionality within drawing and/or editing software. In other cases, the touch digital ruler 106 might be distinct from an application that performs the drawing functionality. In this regard, the touch digital ruler 106 might identify a manner in which to draw one or more strokes and, thereafter, communicate with an application that subsequently performs the drawing functionality. Irrespective of whether the touch digital ruler 106 or another component performs the stroke drawing, a user of the computing device 100 can view the drawing, and strokes performed in accordance therewith, via the touchscreen display 102.

Although the computing device 100 of FIG. 1 is described as a having a touchscreen display, as can be appreciated, computing devices without a touchscreen display are contemplated as within the scope of embodiments described herein. In this regard, a point(s) selected via a mouse or other selecting device can be detected and used in accordance herewith to initiate drawing a stroke(s) in a precise manner. As another example, an air gesture can be detected and used in accordance herewith to initiate drawing a stroke(s) in a precise manner.

Figure 2:
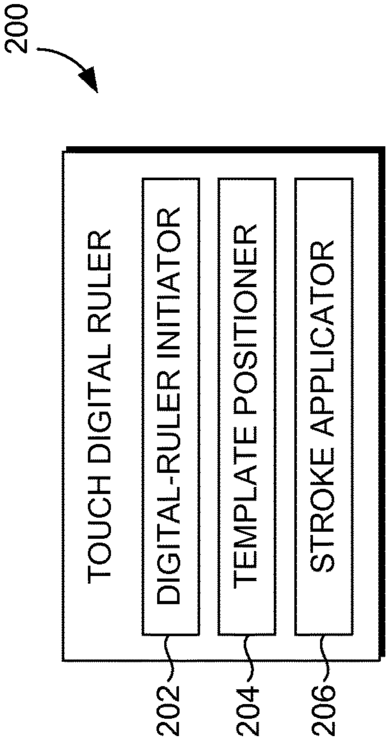
FIG. 2 is a block diagram of an exemplary touch digital ruler for facilitating erasure of strokes, in accordance with embodiments of the present invention.

Turning now to FIG. 2, a block diagram is provided illustrating an exemplary touch digital ruler 200 in which some embodiments of the present invention may be employed. The touch digital ruler 200 is generally configured to enabling precise drawing of a stroke(s) on a canvas or background using a touch input or motion. As described in more detail below, in one implementation, placement of a stroke aligns with or contours an edge of a template positioned on the canvas. In this regard, the touch digital ruler 200 can be used to position a template on the background in a location at which a user desires to draw a precise stroke and, thereafter, initiate a stroke drawing via a touch input proximate to the template.

A template refers to any line or shape that can be used to draw a stroke over a background or canvas. In this way, a template is presented that can be "traced" by a user to result in a precise or predetermined line or shape. A template can take on any shape, size, or form, such as, for example, a rotation or circular pattern, a straight line pattern, a polygonal shape, a pattern form, or any shape or object. Generally, a template is formed from one or more template edges, which may also be of any shape, size, or form. For instance, a template edge might be a straight, curved, zig-zag, patterned, or the like.

Generally, a user indicates or initiates a stroke path in association with a template in some manner. For instance, a user may contact a finger on a touchscreen and move the finger in proximity to a template edge to generate a drawing stroke that aligns with the template edge. As another example, a user might move a selector in proximity to a template edge via a mouse to generate a stroke that aligns with the template edge. A stroke or drawing stroke can presented on a background having any width, length, color, pattern, etc. A background or canvas refers to a background view that can have content (e.g., strokes) presented over the background. As can be appreciated, the background or canvas can be of any size, shape, color, pattern, image, etc. By way of example, a user may select a background, such as a patterned background. Upon selecting a background, a user may initiate various strokes in association with a touch digital ruler to overlay the background in a precise manner.

As shown in FIG. 2, the touch digital ruler 200 includes a digital-ruler initiator 202, a template positioner 204, and a stroke applicator 206. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The digital-ruler initiator 202 is configured to initiate a touch digital ruler. As such, the digital-ruler initiator 202 permits application of a touch digital ruler. As previously described, the touch digital ruler is generally configured to enable a digital ruler that is used to draw precise strokes in accordance with a selected template on a canvas or background using a touch input.

In some embodiments, the digital-ruler initiator 202 enables application of the touch digital ruler upon detecting a user indication to apply the digital ruler. A user might provide such an indication in any manner. For example, a user may select a "digital ruler" or "touch digital ruler" icon or setting (e.g., in the navigation bar) to initiate the touch digital ruler. Accordingly, the digital-ruler initiator 202 might detect an indication to apply a digital ruler and, in response thereto, enable the utilization of the touch digital ruler. As can be appreciated, in some cases, a touch digital ruler may be implemented in addition or in the alternative to a separate hardware digital ruler, such as ADOBE SLIDE.

In other embodiments, the digital-ruler initiator 202 might enable the touch digital ruler functionality automatically. For example, in accordance with a default setting or initiation of an application including the touch digital ruler, the digital-ruler initiator 202 may automatically permit application of the touch digital ruler.

Figure 7:
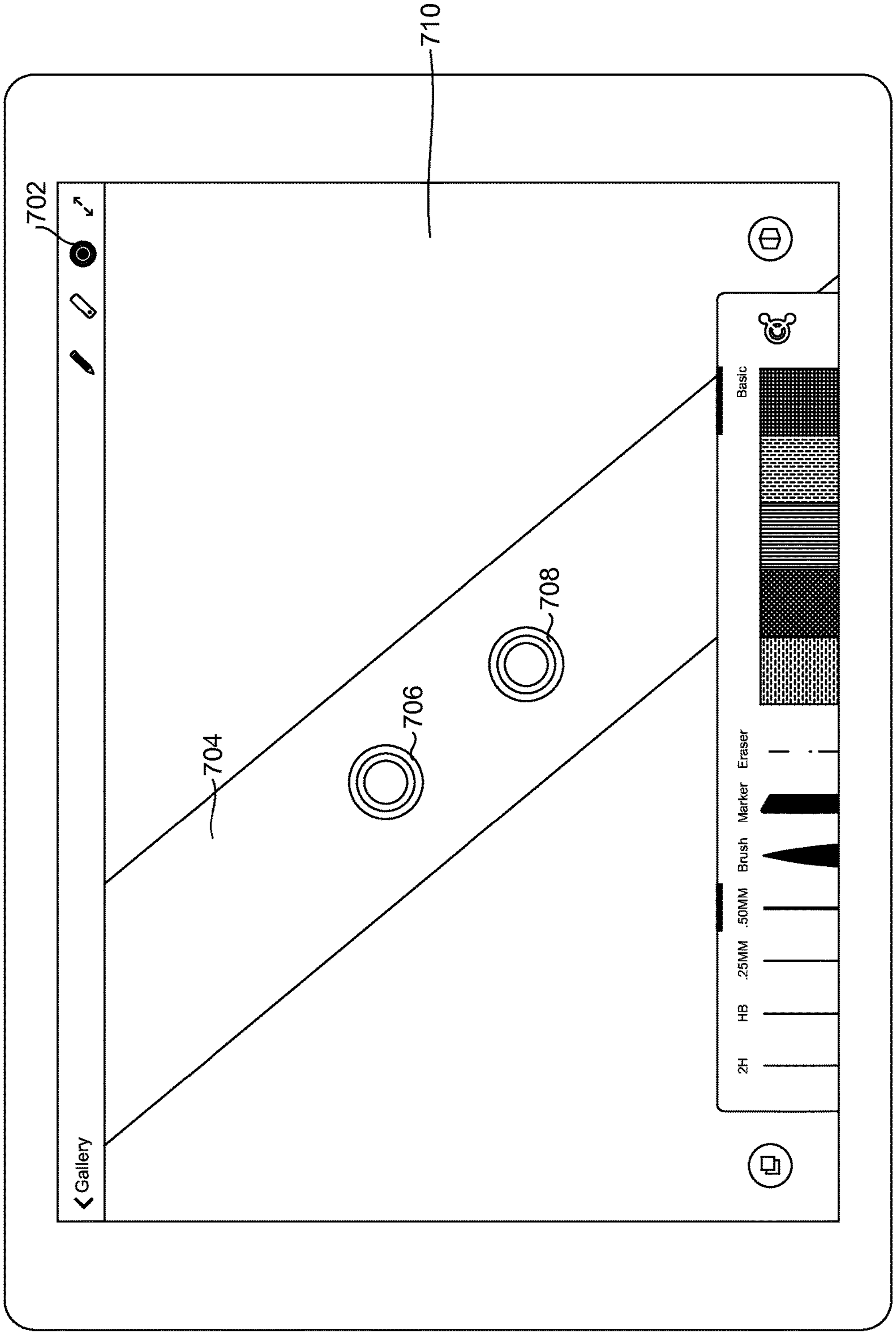
FIG. 7 is an exemplary graphical user interface illustrating another template for use in generating a precise drawing, in accordance with embodiments of the present invention.

Upon initiating the touch digital ruler, a template can be used to draw a stroke in a precise manner. The template positioner 204 is configured to position a template on a canvas or background for use in generating a precise drawing stroke. A template can be positioned on a canvas according to a preferential or desired placement of a user. A template can be any template that can be used to draw a stroke over a background or canvas. That is, a template can be "traced" to generate a precise stroke. As previously described, a template can take on any shape, size, or form, such as, for example, a rotation or circular pattern, a straight line pattern, a polygonal shape, a pattern form, an object, or the like. In some cases, a template can take on the form of an image or item such that it represents a particular object or item as opposed to a generic shape or form. For instance, a template may represent a chair, a person, a car, or any other object or set of objects. One exemplary form of a template can take on the shape of a conventional ruler. That is, a template may be illustrated as two parallel lines with a particular distance between the parallel lines (e.g., one inch), as illustrated in FIG. 7, for example.

In some embodiments, a particular template to utilize for drawing a stroke(s) can be selected by a user. Such a template selection may be made in any manner. For instance, a user may select an icon or representation of a particular template desired for use by touching the corresponding icon or representation. In some cases, a user may rotate through a set of templates by touching or contacting (e.g., tapping) a touch point on a touchscreen display. For example, and with reference to FIG. 6, a user may select a first touch point 604 to rotate through a set of available templates and select a second touch point 606 to rotate in the opposite direction through the set of available templates. Generally, a touch point refers to a representation presented on a display screen that is used to control or manipulate a template in some manner. In embodiments, a touch point is presented on a display screen and indicates a location at which contact is currently made or was made prior to removing an object (e.g., finger or stylus) from the touchscreen display. For example, a touch point may be positioned at a location at which a user's finger is currently placed or was placed prior to removing the finger from the touchscreen display. A touch point may be represented in any manner, such as, for example, a shape, a ring, an object, an icon, a symbol, a color, etc.

Upon identifying a particular template to use, the specific template that the user wishes to utilize may be selected in any manner, such as, for instance, a double tap on the template or touch point, a hover or tap-and-hold on the template or touch point, or the like. Utilizing touch points to view and/or select a template is only one implementation contemplated by the inventors and embodiments described herein are not limited hereto.

In some cases, a default template may be automatically selected for display. Such a default template may be the only available template for use or may be the initial template displayed to the user. In the latter case, the user may then select an alternative template to replace the initially presented default template. For instance, a template representing a traditional ruler may be initially displayed. Upon display of the initial ruler, the user may select to change the specific template used, for example, to a circular shape, rectangular shape, triangular shape, or the like. As described above, such a template selection may be made via a user contacting a touch point(s).

The template positioner 204 is configured to position a template over a canvas. The template positioner 204 can position a template in any number of ways based on user interactions with a template, a touch point, and/or a touchscreen. In this regard, the template positioner 204 can translate, rotate, scale, and/or transform a template in accordance with user indications. Accordingly, a user can position a template according to his or her preferences on a canvas. Such manipulations to a template can be performed in any number of manners, and the examples provided herein are merely exemplary in nature.

As will be described in more detail below, in some embodiments, a template, or portion thereof, can be manipulated using one or more touch points in association with an application. That is, a touch point or set of touch points can be used to specifically position a template, or template edges. Any number of touch points can be used, but various embodiments of the invention are generally described herein using two touch points.

A template may be translated on the display based on a touch motion or input to align a template as desired. In this regard, a template may be moved up, down, and/or to the side by moving a finger or other object positioned over a template in a desired direction. As can be appreciated, such a translation may occur when contact is made, for instance, with a touch point, with multiple touch points, with any portion of a template, with a particular area of a template, or the like. In an embodiment using dual touch points, movement of a finger positioned over a single touch point may be used to effectuate translation of the template. Use of a single touch point to translate a template may be used to constrain rotation of the template and thereby maintain a parallel template upon movement of the template. In effect, when a user only contacts a single touch point, the parallel axis remains intact as the template is moved in various directions. Other implementations to translate a template may additionally or alternatively be used, such as, for instance, manipulation of multiple touch points.

A template may also be rotated to align the template as desired by the user. In this regard, a template may be rotated any number of degrees by moving a finger(s) or other object positioned over a template in a desired rotation or direction. As can be appreciated, such a rotation may occur when contact is made, for instance, with a touch point, with multiple touch points, with any portion of a template, with a particular area of a template, or the like. In an embodiment using dual touch points, movement of fingers positioned over both touch points in a rotational manner may be used to effectuate rotation of the template. Use of two touch points to rotate the template may be used to distinguish from translation of the template using one touch point. Other implementations to rotate a template may additionally or alternatively be used, such as, for instance, manipulation of a single touch point.

The template may also be scaled or sized as needed by the user. In this regard, a template may be increased or decreased in size by moving a finger(s) or other object positioned over a template in a particular manner. As can be appreciated, such a scaling may occur when contact is made, for instance, with a touch point, with multiple touch points, with any portion of a template, with a particular area of a template, or the like. In an embodiment using dual touch points, movement of fingers positioned over both touch points or positioned over the template may be used to effectuate scaling of the template by moving the fingers closer together or further apart to decrease or increase the size of the template, respectively. Other implementations to scale a template may additionally or alternatively be used, such as, for instance, manipulation of a single touch point.

As can be appreciated, in some cases, a template may be desired to be transformed or skewed. For example, a user may desire to transform an equilateral triangle template to an isosceles triangle template. In such a case, the user may wish to transform one or more edges of the template to generate the desired triangle. Transformation may occur in any number of manners including, use of one touch point or two touch points or contact with template. In some cases, a user may select a template edge for a predetermined or threshold amount of time and, upon exceeding a threshold time, manipulate the edge to the appropriate size, position, etc. For instance, upon contacting a template edge for two seconds, the template edge may turn a color (e.g., blue) indicating the template edge may be manipulated to transform the template, or portion thereof.

Alignment guides may also be used to more precisely draw one or more strokes. Alignment guides facilitate connecting end points or other points (e.g., a mid-point) such that two lines can intersect appropriately. For example, alignment guides may be presented when two lines are approximately 90 degrees or 45 degrees relative to one another. That is, when a user moves a template to a location in which at least a portion of the template is near an intersection with a particular aspect of a drawing stroke, such as an end point, the template may automatically move or "snap" to the particular aspect (e.g., end point) of the drawing stroke such that the template edge connects or intersects to the drawing stroke. In some cases, alignment guides are presented in association with a previous stroke and/or the template to visually represent an intersection (e.g., a 90 degree angle between a template edge and a previous drawing stroke).

Generally, to manipulate an electronic template based on user interactions, the template positioner 204 can be configured to detect user interactions in association with a template, touch point(s), and/or the touchscreen. Such user interactions may be referred to herein as template interactions, that is, motion or interaction that is applied to or associated with a template. Accordingly, the template positioner 204 may identify a template interaction, or portion thereof. That is, the template positioner 204, or other component in communication therewith, may detect at least a portion of a template interaction, for example, in accordance with a touch motion and/or contact with one or more touch points via a touchscreen. A template interaction refers to any path, motion, or interaction designated for manipulating a template, or a portion thereof. A template interaction can take on any shape, pattern, direction, or form as described above (e.g., touch point and/or motion).

Various contact data might be used to detect a template interaction. For example, a position indicator refers to an indication of a position, location, or area of a template interaction, or portion thereof (e.g., contact with a touchscreen display). Accordingly, a position indicator might be a pixel(s) contacted, an x and/or y coordinate associated with a point(s) of contact (e.g., an x and/or y coordinate of a pixel that corresponds with a contacted area of a touch display screen), or the like. Additional or alternative data may be used in detecting a template interaction. For example, a direction indicator refers to a direction of a template interaction. A velocity indicator refers to a velocity in which a template interaction is performed. An acceleration indicator refers to an acceleration of a template interaction. A magnitude indicator refers to a magnitude, distance, extent, displacement, or degree of a template interaction. A template interaction can be provided in any number formats including a touch gesture indicated through a touch interface, an air gesture indicated by a user made in space, or a mouse gesture indicated through a selector or cursor, or the like.

The template positioner 204 might receive, retrieve, or access signals from one or more touch sensors indicating touch. In embodiments, contact data might be raw data generated by one or more touch sensors, such as touch sensor(s) 104 associated with touchscreen display 102 of FIG. 1. Alternatively or additionally, contact data may be derived, calculated, identified, or determined, for example, based on raw data generated by touch sensors. That is, signals generated from touch sensors may be processed to identify contact data. By way of example only, signals received by the template positioner 204, or another component, can be processed to determine x and/or y coordinates identifying locations that correspond with an area of a touchscreen display contacted by an object. Any algorithm and/or lookup technique can be utilized to normalize, determine, calculate, identify, and/or derive various types of contact data.

Upon detecting a user interaction(s) or template interaction, the template positioner 204 can identify a particular manner in which to manipulate a template. That is, based on a template interaction detected, the template positioner 204 can determine or identify a manner in which to manipulate the template. By way of example only, the template positioner 204 can identify a template manipulation in accordance with a type of motion, a motion direction, a motion velocity, a motion acceleration, etc. In implementations using touch points, the template positioner 204 can identify a manner in which to manipulate the template in accordance with the number of touch points contacted or a specific touch point(s) contacted. As described above, a template manipulation (e.g., translation, rotation, scale, alignment, transformation) to apply based on a user interaction may be configured in any number of ways and is not limited to any example provided herein. Such a determination may be made using a lookup system, a set of rules, an algorithm, or any other methodology or combination of methods to determine template manipulation based on the template interactions provided by a user.

By way of example only, the template positioner 204 might recognize and apply a template translation when a user contacts a touch point while simultaneously sliding a finger contacting the touch point or contacting the template, a rotational translation when a user contacts two touch points while simultaneously moving a finger contacting the touch points or contacting the template, a template scaling when a user contacts a template with two fingers and slides the fingers closer together or further apart, and a template transformation when a user contacts a template, or portion thereof, for a particular length of time and then contacts the template or template edge to transform the template. As can be appreciated, each of these template manipulations can be distinguished by the template positioner 204 from a simple motion of a single finger that is used to initiate drawing a stroke.

The stroke applicator 206 is configured to initiate and/or perform drawing functionality. In embodiments, the stroke applicator 206 initiates and/or draws a stroke in accordance with a touch input provided via a touchscreen display. In accordance with implementations described herein, a stroke(s) can be drawn on the canvas to align with a template edge that is positioned in accordance with a user's preference. As a result, a stroke is drawn in a precise manner, such as a straight line. Such a stroke or drawing stroke refers to the actual line or drawing representation this is presented on the background or canvas.

Initially, the stroke applicator 206 may identify the stroke path, or portion thereof. That is, the stroke applicator 206, or other component in communication therewith, may detect at least a portion of a stroke path being traversed, for example, in accordance with a touch motion or contact with a touchscreen. A stroke path refers to any path designated for drawing at least a portion of content (e.g., a drawing or sketch). A stroke path can take on any shape, pattern, or form such as, for example, a rotation or circular pattern, a line pattern, a polygonal shape, a free-form shape, or the like.

Various contact data might be used to detect a stroke path. For example, a position indicator refers to an indication of a position, location, or area of a stroke path, or portion thereof (e.g., contact with a touchscreen display). Accordingly, a position indicator might be a pixel(s) contacted, an x and/or y coordinate associated with a point(s) of contact (e.g., an x and/or y coordinate of a pixel that corresponds with a contacted area of a touch display screen), or the like. Additional or alternative data may be used in detecting a stroke path. For example, a direction indicator refers to a direction of a stroke path. A velocity indicator refers to a velocity in which a stroke path is performed. An acceleration indicator refers to an acceleration of a stroke path. A magnitude indicator refers to a magnitude, distance, extent, displacement, or degree of a stroke path. A stroke path can be provided in any number formats including a touch gesture indicated through a touch interface, an air gesture indicated by a user made in space, or a mouse gesture indicated through a selector or cursor, or the like.

The stroke applicator 206 might receive, retrieve, or access signals from one or more touch sensors indicating touch. In embodiments, contact data might be raw data generated by one or more touch sensors, such as touch sensor(s) 104 associated with touchscreen display 102 of FIG. 1. Alternatively or additionally, contact data may be derived, calculated, identified, or determined, for example, based on raw data generated by touch sensors. That is, signals generated from touch sensors may be processed to identify contact data. By way of example only, signals received by the stroke applicator 206, or another component, can be processed to determine x and/or y coordinates identifying locations that correspond with an area of a touchscreen display contacted by an object. Any algorithm and/or lookup technique can be utilized to normalize, determine, calculate, identify, and/or derive various types of contact data.

Upon detecting a stroke path, or portion thereof (e.g., initial contact point for a stroke), a determination may be made as to whether to draw the stroke in association with a template edge. Any number of technologies may be used to distinguish between a stroke to align with the template edge and a stroke to be drawn in a free-form manner. In some implementations, the stroke applicator 206 may initiate and/or draw a stroke in association with a template automatically. For example, in some cases, a stroke may be automatically drawn in alignment with a template edge when the touch digital ruler is indicated as activated, when the template is presented on the display screen, or the like.

In some implementations, the proximity or distance between the stroke path and a template edge can be used to determine whether the drawing stroke should be drawn in accordance with the particular template edge. For instance, a stroke path within a predetermined distance or proximity from a template edge may be deemed to correspond or overlap with the template edge such that the drawing stroke contours the template edge. By way of example, and not limitation, a template edge being within a predetermined proximity of pixels or coordinates associated with a stroke path, or portion thereof, can be deemed as an indication to draw a stroke that aligns with the template edge. To the extent the stroke path is deemed to correspond, overlap, or coincide with the template edge, the stroke is drawn along the template edge as the stroke path is traversed.

In yet another implementation, a stroke path detected within or touching the boundaries of a template may be deemed to be a stroke path intended to draw a stroke that aligns with the template edge, while a stroke path detected outside the boundaries of the template may be deemed to be a free-form stroke path that does not automatically align with the template edge. In this manner, a drawing mode is detected based on a location or position selected or at which a stroke path exists. In this regard, whether or not a stroke is drawn to contour a template edge can be triggered based on a location or position selected or at which a stroke path traverses. In such embodiments, when a location or position at which a stroke path traverses corresponds or aligns with a template or template edge, a stroke is drawn that aligns with template edge. In effect, by selecting or providing contact within a template, the user is designating a drawing stroke to align with the template regardless of the path of the stroke input by the user. In contrast, when a location or position at which a stroke path is traversed does not correspond, align, or overlay a template, or otherwise indicate a desire to align a stroke with a template edge, a free-form stroke may be detected and applied. Stated differently, when a selection or a stroke path exists at a location that does not align with any template or template edge, a free-form stroke can be applied. In this regard, the drawing stroke aligns with the actual stroke path and not a template or template edge.

As can be appreciated, selection or an indication of a stroke to align with a template edge may be provided in any manner. For instance, a user may contact a touchscreen at a location of a template, click on a template or template edge using a pointer or selector, begin a stroke path within one or more template boundaries, begin or perform a stroke path within a predetermined vicinity of a template or template edge, etc. Selection to align a stroke with a template edge may be discrete from performance of a stroke path or continuous with providing a stroke path. That is, a user may provide a single contact with a template to indicate a desire to utilize a template edge to generate a drawing stroke, remove his or her finger from the touchscreen display, and then begin a touch motion to designate a stroke path, for example. Alternatively, a user may provide an initial contact with a template edge to select the template edge to which to align and, thereafter, continue performance of the stroke path to draw the stroke without removing his or her finger until completing the stroke path.

Other methods can be used to detect or determine whether to align a drawing stroke with a template edge. For example, use of a template may be selected by a user for application. In such an example, a user may select, for instance, an icon indicating a desire to use a template edge to draw a line. Upon selecting such an icon, any stroke paths or any stroke paths within a proximity of a template edge can be drawn to align with the template edge.

In accordance with determining to draw a stroke that aligns with a template edge, the stroke can be drawn and presented on the display screen as the user moves an object (e.g., finger) along the touchscreen display, for example. That is, while a user moves a finger in a motion along a stroke path, a stroke can be drawn in a coordinated manner alongside the edge of a template as though the template is being "traced." The stroke can be drawn in a one-to-one correspondence (or any other scale or ratio) as the motion input by the user. In some cases, the specific template edge at which to draw the stroke may also be identified. Such an identification can be made in any manner, for example, including selecting a template edge that is closest or nearest the stroke path or initial contact of the stroke path.

As previously described, the stroke applicator 206 may perform the stroke drawing or initiate drawing, for example, by providing stroke details to another component that, thereafter, performs the stroke drawing. Irrespective of the component used to draw the stroke, the stroke can be formatted in any number of ways. By way of example only, a stroke can be formatted in various colors, various widths, various patterns, and/or the like. As can be appreciated, such formats may be default formats, system determined formats, or user selected formats.

Figure 3:
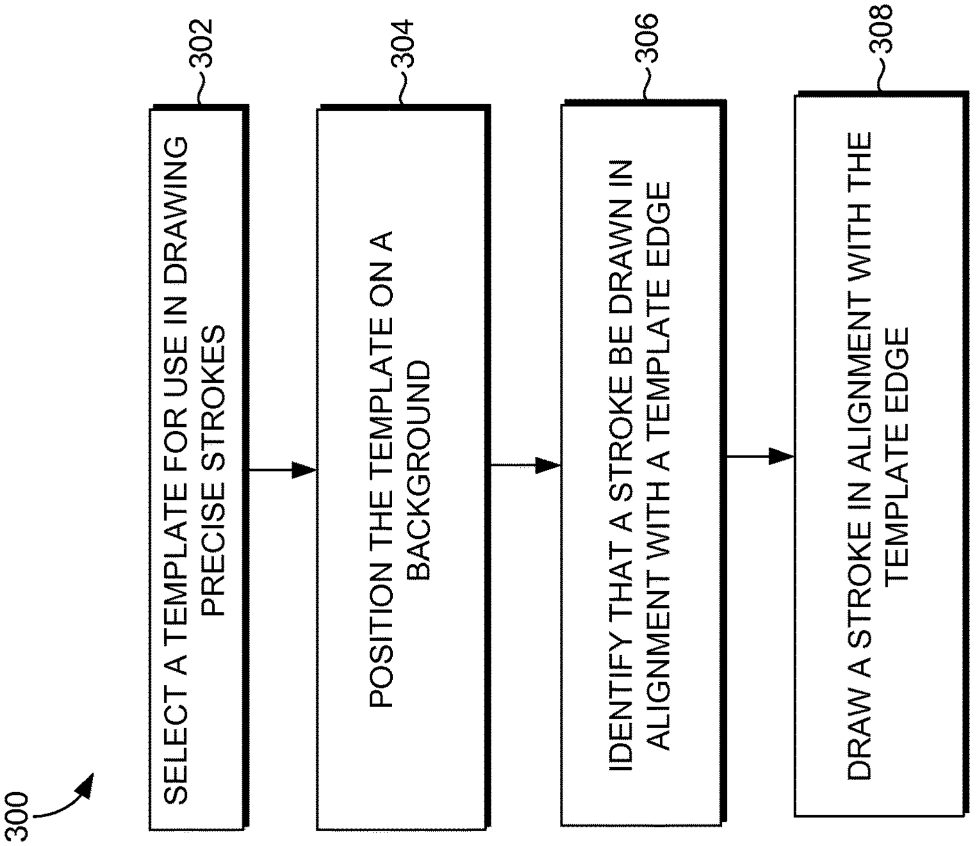
FIG. 3 is a flow diagram showing a method for facilitating performance of touch digital ruler functionality, in accordance with embodiments of the present invention.

Turning now to FIG. 3, a flow diagram is provided that illustrates a method 300 for facilitating performance of touch digital ruler functionality, in accordance with embodiments of the present invention. Initially, as shown at block 302, a template is selected for use in drawing precise strokes. A template may be selected by a user from among a plurality of templates. At block 304, the template is positioned on a background. In this regard, the template might be positioned on a background in accordance with preferences indicated by a user. For example, a user may manipulate positioning of the template using touch inputs that are detected. At block 306, it is identified that a stroke is to be drawn in alignment with, abut, or be alongside or over a template edge. Such an identification can be made in any manner. For instance, an identification to draw a line alongside a template edge may be based on activation of a touch digital ruler, presentation of a template, or a user selection or initiation of a stroke path being within a predetermined proximity of the template or template edge. Thereafter, at block 308, a stroke is drawn that aligns with the edge of the template. Such an alignment with the edge of the template occurs despite the preciseness of the stroke path. That is, a user may apply a stroke path that is near, but not touching, the template edge and/or that is not straight. The stroke, however, can be drawn to align with the edge of the template such that it appears in a precise manner (e.g., a straight line).

Figure 4:
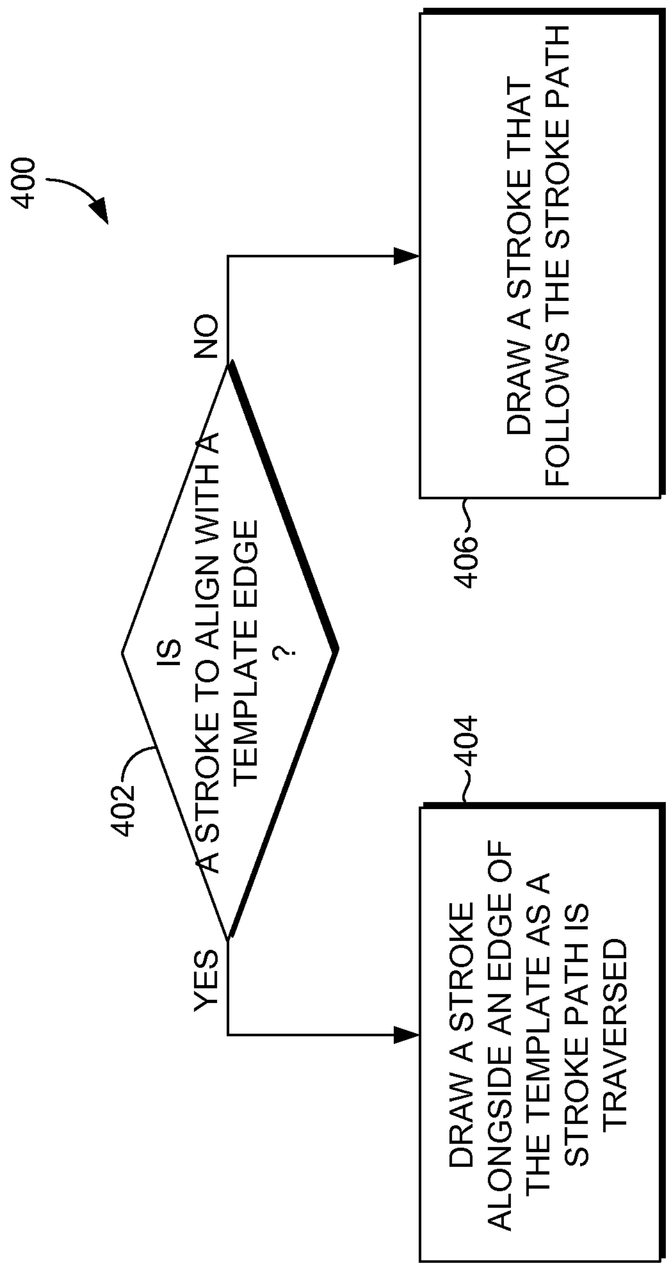
FIG. 4 is a flow diagram showing another method for facilitating performance of touch digital ruler functionality, in accordance with embodiments of the present invention.

Turning now to FIG. 4, a flow diagram is provided that illustrates another method 400 for facilitating performance of touch digital ruler functionality, according to embodiments provided herein. Initially, at block 402, it is determined whether a stroke is to be drawn to align with a template edge. In some cases, such a determination can be made based on whether a touch digital ruler is activated, whether a template is selected for use, etc. In other cases, such a determination can be based on whether a stroke path, or initial contact point of a stroke path, is within a predetermined vicinity of a template or template edge. If it is determined that a stroke is to be drawn to align with a template edge, a stroke is drawn alongside an edge of the template as a stroke path is traversed, as indicated at block 404. In this regard, a stroke being drawn contours the edge of the template in a precise manner. On the other hand, if it is determined that a stroke is not to be drawn to align with a template edge, a stroke is drawn that follows the stroke path, as indicated at block 406. As such, the stroke being drawn aligns with the motion of the user and does not follow the edge of the template.

Figure 5:
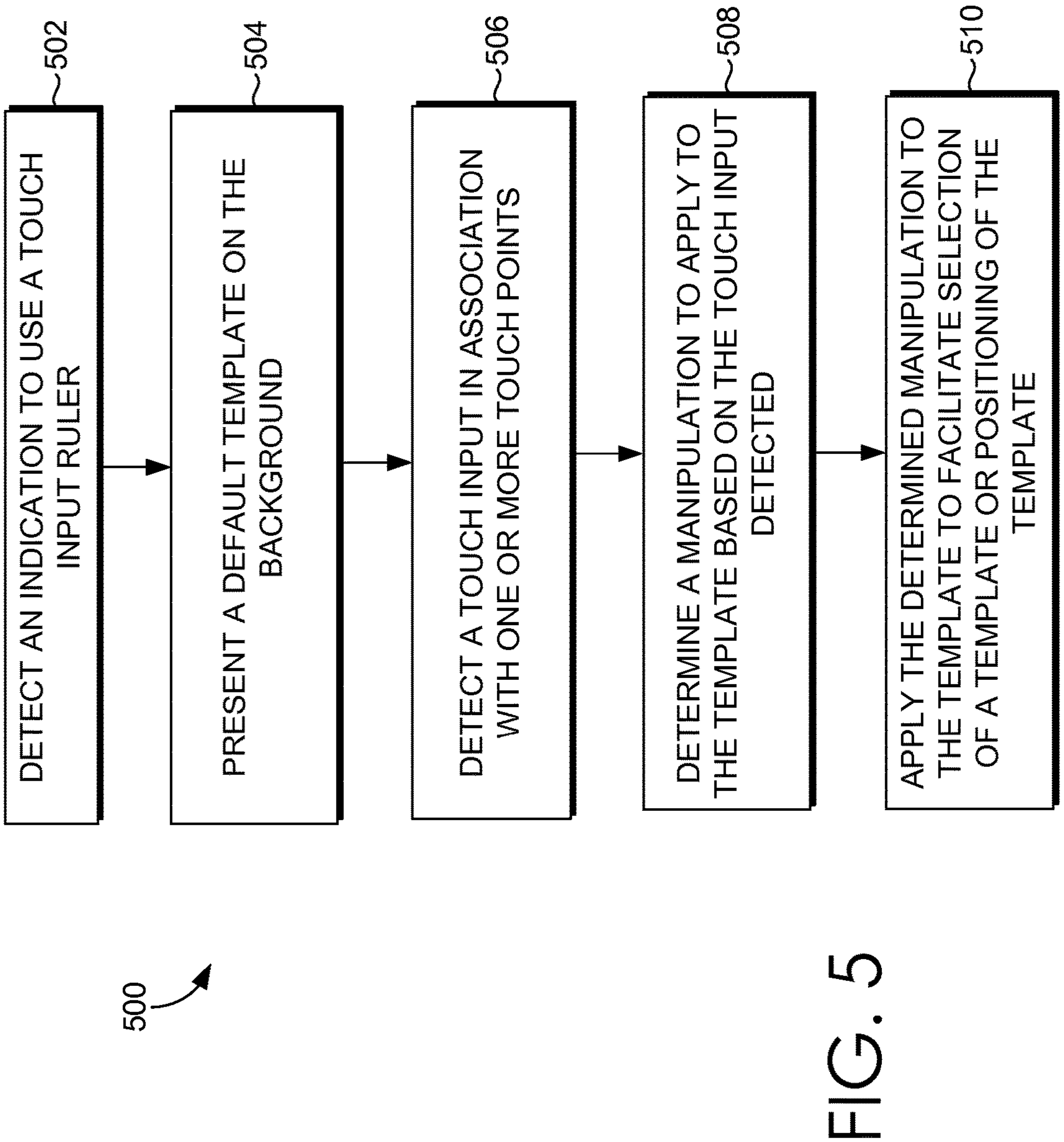
FIG. 5 is a flow diagram showing a method for manipulating a template in accordance with embodiments provided herein.

With reference now to FIG. 5, a flow diagram is provided that illustrates a method 500 for manipulating a template in accordance with embodiments provided herein. Initially, as indicated at block 502, an indication to utilize a touch input ruler is detected. At block 504, a default template is presented on the background. At block 506, a touch input in association with one or more touch points is detected. In this regard, a touch input might be selection, contact, or "tapping" of a touch point or multiple touch points. Alternatively or additionally, a touch input might include movement of one or more touch points in some manner. For example, one or more touch points might be moved or rotated. Thereafter, at block 508, a manipulation to apply to the template is determined based on the touch input detected. By way of example, and without limitation, in some cases, a tapping of a touch point might change a template being presented or initiate a template selection (from among multiple templates). As another example, movement of a single touch point might trigger translation of the template, while movement of two touch points might trigger rotation of the template. In yet another example, movement of the two touch points away from one another might trigger increasing the size of the template while movement of the two touch points toward one another might trigger decreasing the size of the template. The determined manipulation is then applied to the template to facilitate selection of a template or positioning of a template, as indicated at block 510.

Figure 6:
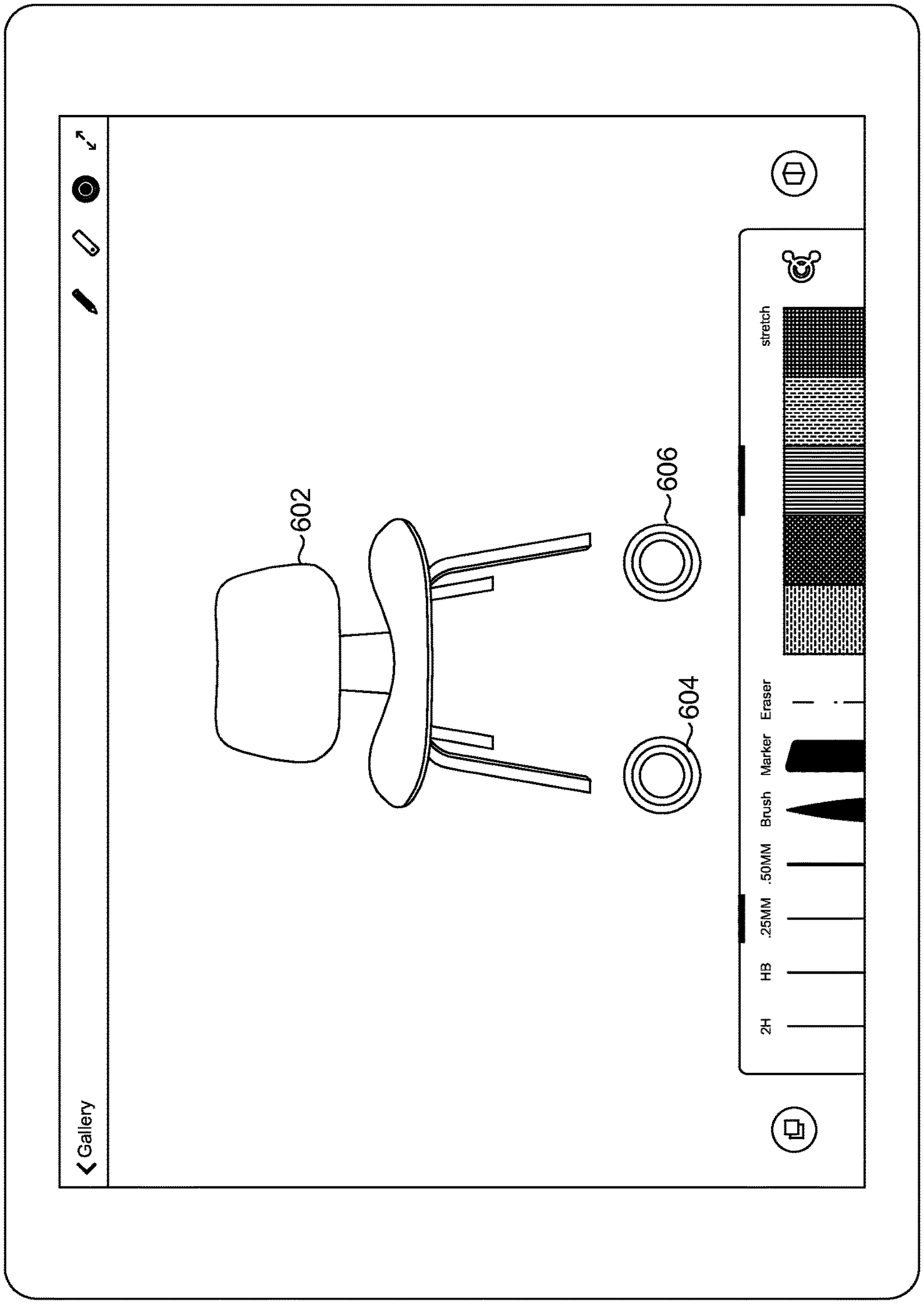
FIG. 6 is an exemplary graphical user interface illustrating a template for use in generating a precise drawing, in accordance with embodiments of the present invention.

Turning now to FIGS. 6-11, FIGS. 6-11 provide exemplary user interfaces in accordance with implementing various embodiments described herein. These are only examples and are not intended to limit the scope of embodiments of the present invention. With initial reference to FIG. 6, FIG. 6 provides an example of a template 602 presented on a display screen. In FIG. 6, the template 602 represents an image, namely, a chair. A user may select the template 602 from among a number of templates by contacting or selecting one or both of touch points 604 or 606. For example, a user may rotate through possible templates by selecting touch point 604. The touch points 604 and 606 can also be used to position the template 602 on the background as desired by the user. Upon positioning the template 602 appropriately, the template can be used to draw strokes that align with the edges of template, as generally described above. In some cases, strokes that align with the template can be generated in accordance with stroke paths provided by the user. In other cases, strokes that align with the template can be generated by "stamping" the template on the background. Such a "stamping" action can be initiated in any manner, such as, for instance, double-tapping the template or a touch point Turning now to FIGS. 7-10, FIGS. 7-10 illustrate drawing precise lines using a template. Initially, a user may select to initiate a touch digital ruler by selecting icon 702. Upon selecting icon 702, a template 704 is presented that enables a user to generate precise drawing strokes. Touch point 706 and touch point 708 can be utilized, either alone or in combination, to position the template 704 on the background 710 according to the user's preferences.

Assume now that a user desires to draw a straight line using a template. As such, as illustrated in FIG. 8, a user may touch a touchscreen display along a stroke path 804. In accordance with the touch digital ruler being activated or the stroke path 804 being in proximity to the edge 806 of the template 802, a stroke 808 is drawn alongside the template edge 806 corresponding with the stroke path 804.

Figure 9:
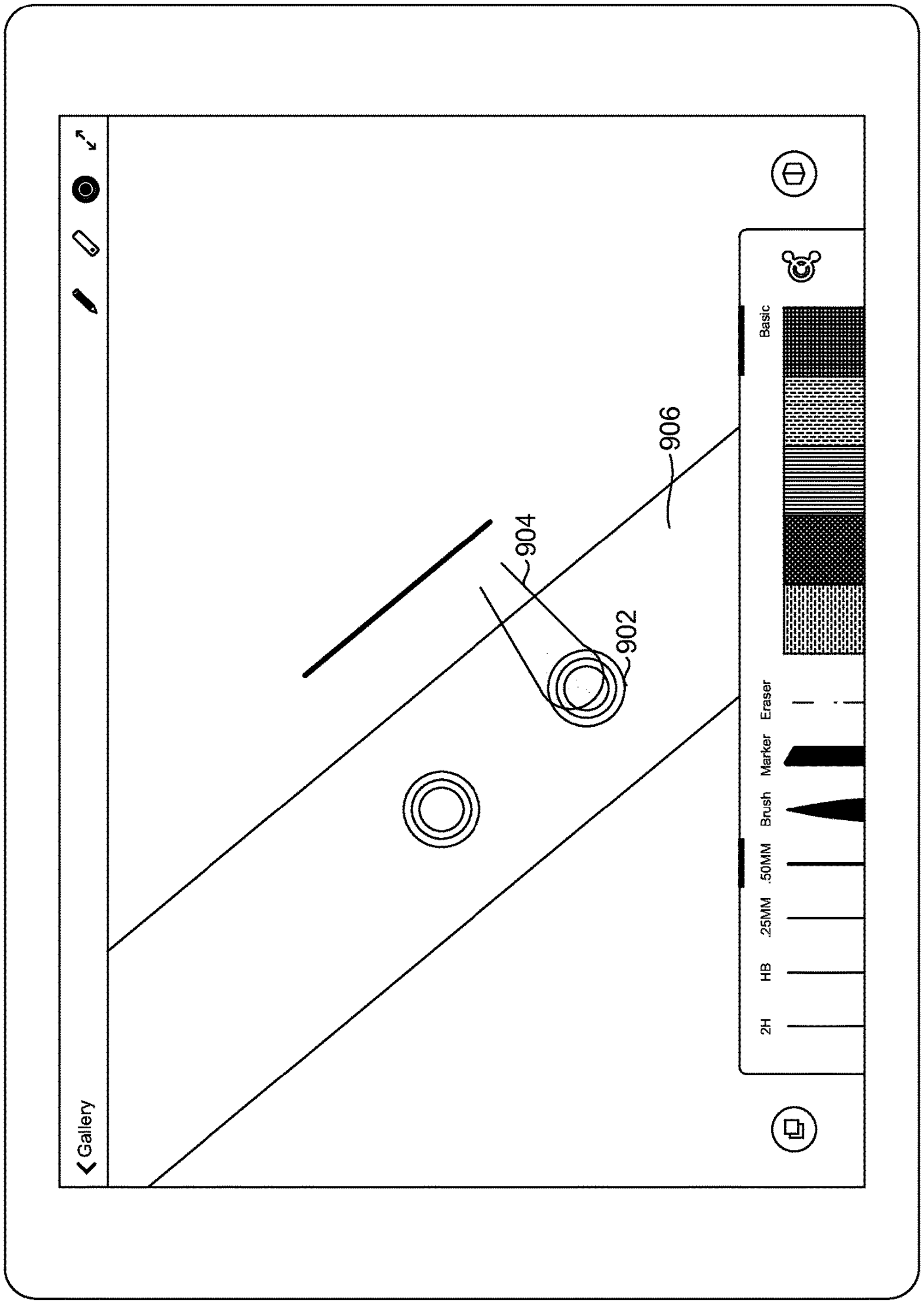
FIG. 9 is an exemplary graphical user interface illustrating positioning of a template to generate parallel lines, in accordance with embodiments of the present invention.
Figure 10:
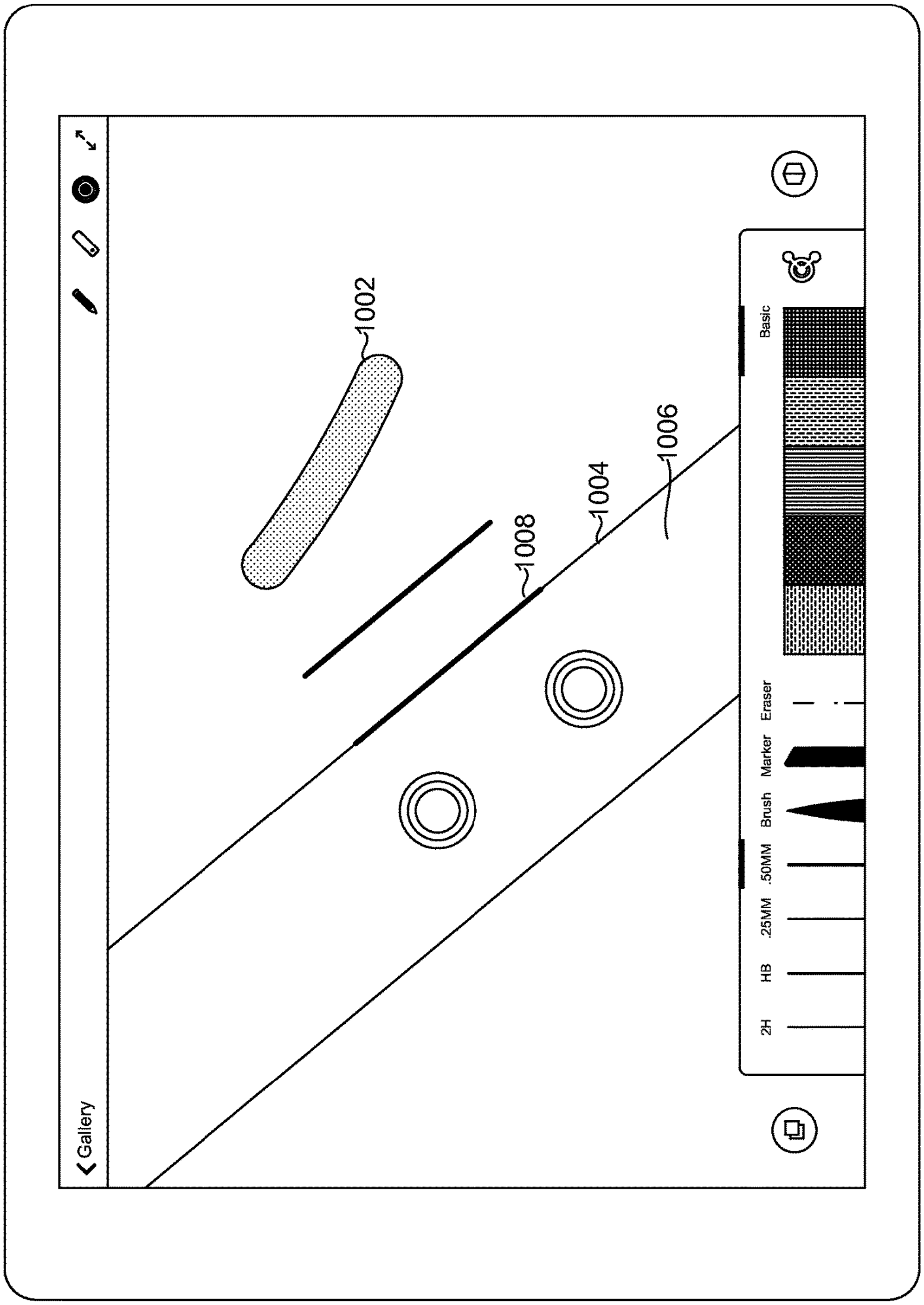
FIG. 10 is an exemplary graphical user interface illustrating a drawing stroke aligned with a template based on a stroke path to generate parallel lines, in accordance with embodiments of the present invention.

To draw a stroke parallel to stroke 808 of FIG. 8, the user can contact a touch point, such as touch point 902 of FIG. 9. Upon contacting the touch point 902, the user can slide his or her finger along a template path 904 to move the template 906 in a parallel manner. Upon positioning the template 906 in an appropriate place to draw a parallel stroke, the user can touch a touchscreen display along a stroke path 1002 of FIG. 10. In accordance with the touch digital ruler being activated or the stroke path 1002 being in proximity to the edge 1004 of the template 1006, a stroke 1008 is drawn alongside the template edge 1004 corresponding with the stroke path 1002.

Figure 11:
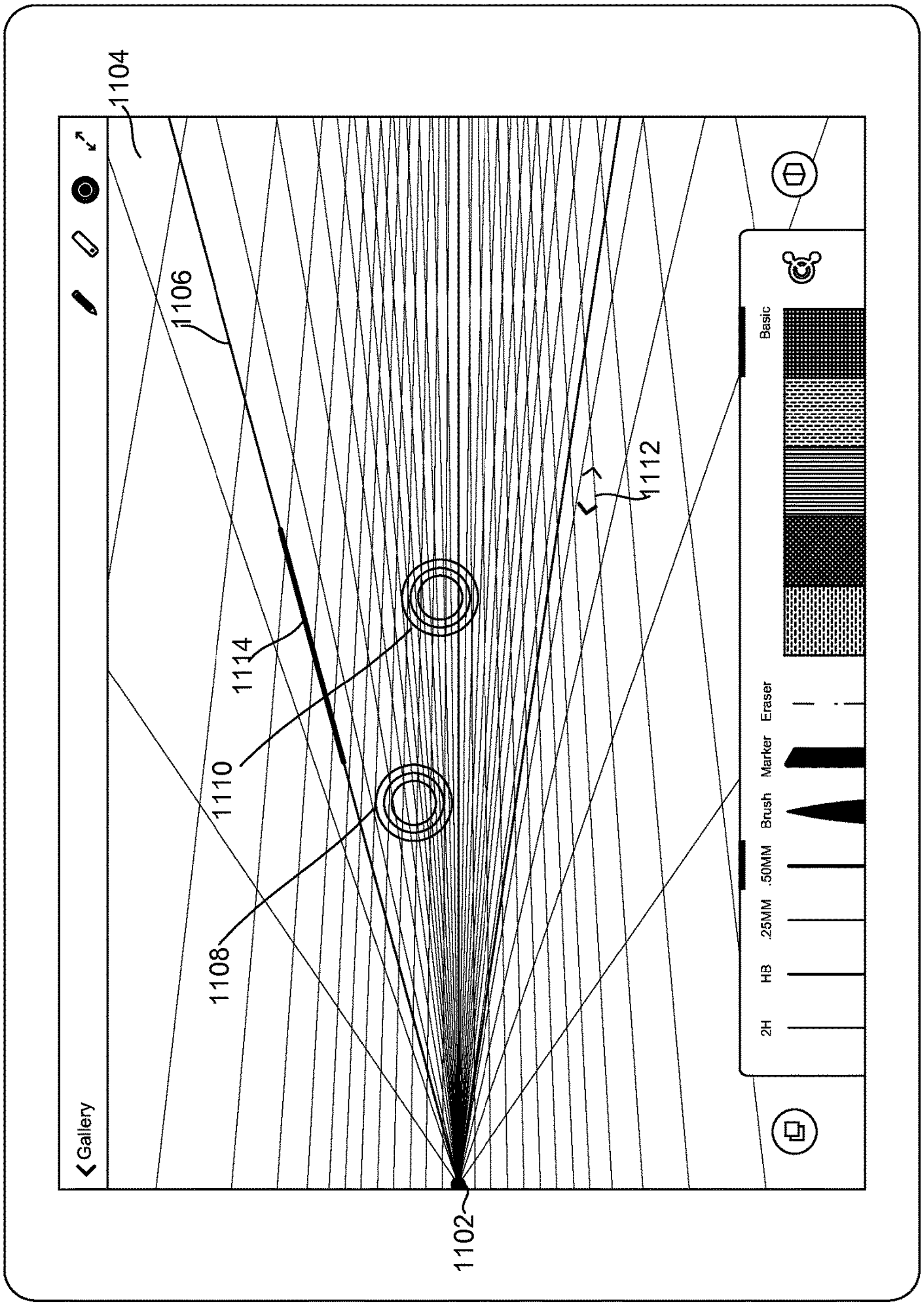
FIG. 11 is an exemplary graphical user interface illustrating utilization of a touch digital ruler to generate a perspective drawing, in accordance with embodiments of the present invention.

With reference now to FIG. 11, a touch digital ruler is provided that enables drawing in perspective using touch interactions. Upon an initial selection to utilize a perspective mode, the user can position a vanishing point 1102 on the background 1104. Upon setting up a vanishing point in a perspective mode, when the touch digital ruler is invoked, a set of lines are presented that are parallel in perspective. As the user moves one or more touch points around with a finger(s), a particular line associated with the vanishing point can be emphasized to illustrated activation of that line for use as a template. For instance, in FIG. 11, line 1106 is the presently selected line for use as a template based on the motion of the touch points 1108 and 1110. With line 1106 selected for use as a template, a user may input a stroke path near the line 1106 to generate a drawing stroke 1114 that aligns with the line template 1106. The user may switch to another vanishing point using a toggle button 1112, for example.

Figure 12:
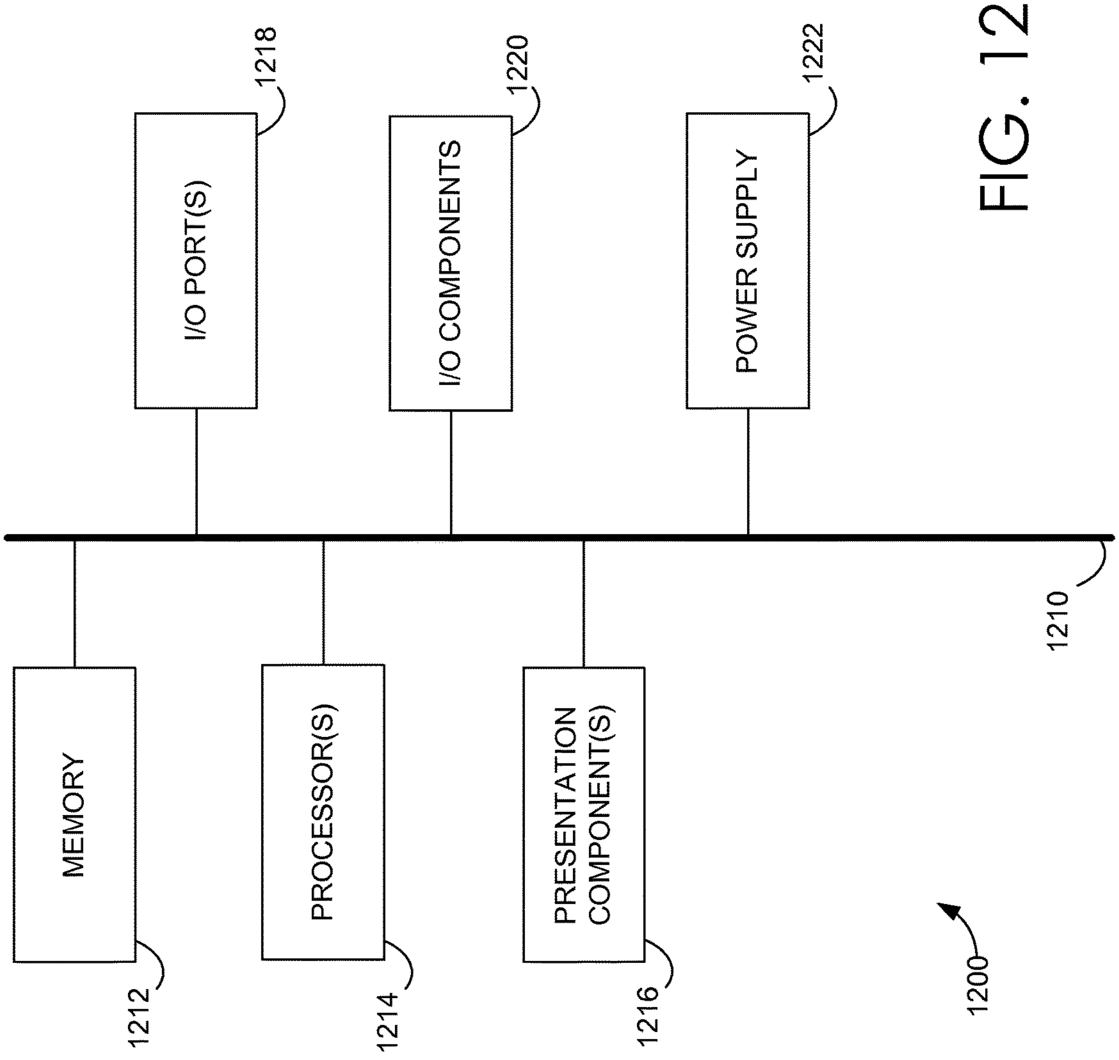
FIG. 12 is a block diagram of an exemplary computing device in which embodiments of the invention may be employed.

Having briefly described an overview of embodiments of the present invention, an exemplary operating environment in which embodiments of the present invention may be implemented is described below in order to provide a general context for various aspects of the present invention. Referring initially to FIG. 12 in particular, an exemplary operating environment for implementing embodiments of the present invention is shown and designated generally as computing device 1200. Computing device 1200 is but one example of a suitable computing environment and is not intended to suggest any limitation as to the scope of use or functionality of the invention. Neither should the computing device 1200 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 12, computing device 1200 includes a bus 1210 that directly or indirectly couples the following devices: memory 1212, one or more processors 1214, one or more presentation components 1216, input/output (I/O) ports 1218, input/output components 1220, and an illustrative power supply 1222. Bus 1210 represents what may be one or more busses (such as an address bus, data bus, or combination thereof). Although the various blocks of FIG. 12 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 12 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 12 and reference to "computing device."

Computing device 1200 typically includes a variety of computer-readable media. Computer-readable media can be any available media that can be accessed by computing device 1200 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1200. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1212 includes computer-storage media in the form of volatile and/or nonvolatile memory. The memory may be removable, non-removable, or a combination thereof. Exemplary hardware devices include solid-state memory, hard drives, optical-disc drives, etc. Computing device 1200 includes one or more processors that read data from various entities such as memory 1212 or I/O components 1220. Presentation component(s) 1216 present data indications to a user or other device. Exemplary presentation components include a display device, speaker, printing component, vibrating component, etc.

I/O ports 1218 allow computing device 1200 to be logically coupled to other devices including I/O components 1220, some of which may be built in. Illustrative components include a microphone, joystick, game pad, satellite dish, scanner, printer, wireless device, etc. The I/O components 1220 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1200. The computing device 1200 may be equipped with depth cameras, such as stereoscopic camera systems, infrared camera systems, RGB camera systems, touchscreen technology, and combinations of these, for gesture detection and recognition. Additionally, the computing device 1200 may be equipped with accelerometers or gyroscopes that enable detection of motion. The output of the accelerometers or gyroscopes may be provided to the display of the computing device 1200 to render immersive augmented reality or virtual reality.

As can be understood, embodiments of the present invention provide for, among other things, facilitating utilization of a touch digital ruler. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more non-transitory computer storage media storing computer-useable instructions that, when used by one or more computing devices, cause the one or more computing devices to perform operations comprising:

positioning a first electronic template presented on a background in accordance with one or more user interactions with a touchscreen, wherein positioning the first electronic template is based at least on a first user contact with one or more first touch points presented on a user interface via the touchscreen, wherein the one or more first touch points correspond to the presented electronic template;

upon a second user contact with one of the one or more first touch points, replacing the positioned first electronic template with a second electronic template that is of a different shape from the first electronic template;

detecting a touch path that traverses at least a portion of the touchscreen; and drawing a stroke on the user interface:

alongside an edge of the second electronic template based on a determination that the touch path falls within a predetermined distance on the touchscreen from the edge, and over the detected touch path based on a determination that the detected touch path exceeds the predetermined distance from the edge.

2. The one or more non-transitory computer storage media of claim 1, further comprising receiving a selection to use the second electronic template as a template for drawing precise strokes.

3. The one or more non-transitory computer storage media of claim 1, wherein positioning the first electronic template comprises translating the first electronic template in accordance with a user interaction when a single touch point is contacted by the user.

4. The one or more non-transitory computer storage media of claim 1, wherein positioning the first electronic template comprises rotating the first electronic template in accordance with a user interaction when two touch points are simultaneously contacted by the user.

5. The one or more non-transitory computer storage media of claim 1 further comprising, upon replacing the first electronic template with the second electronic template, repositioning the second electronic template on the background in accordance with a second set of at least one user interaction with the touchscreen, wherein repositioning the second electronic template is based at least on a user contact with the at least one touch point presented on the user interface via the touchscreen.

6. The one or more non-transitory computer storage media of claim 5, wherein the repositioning of the second electronic template is based on a determination made as to whether a single touch point is contacted by the user or two touch points are contacted by the user, wherein a first manipulation is performed when a single touch point is contacted and a second manipulation is performed when two touch points are contacted.

7. The one or more non-transitory computer storage media of claim 5, wherein repositioning the second electronic template comprises translating the second electronic template in accordance with a user interaction when a single touch point is contacted by the user.

8. The one or more non-transitory computer storage media of claim 5, wherein repositioning the second electronic template comprises rotating the second electronic template in accordance with a user interaction when two touch points are simultaneously contacted by the user.

9. A computer-implemented method comprising:

positioning a first template on a screen based on detecting a first user contact with one or more first touch points;

replacing the positioned first template with a second template, based on detecting a second user contact with one of the one or more first touch points;

determining, via a computing device, that a stroke path is initiated on the screen;

identifying an edge of the second template that is nearest the location at which the stroke path is initiated, wherein the second template is configured to facilitate a drawing of precise strokes; and automatically drawing a line as the stroke path is detected:

alongside the identified edge of the template based on a determination that the stroke path falls within a predetermined distance on the screen from the identified edge, irrespective of whether the stroke path coincides with the edge of the template, and over the stroke path based on a determination that the stroke path exceeds the predetermined distance from the edge.

10. The method of claim 9, wherein the stroke path is initiated via a contact with a touchscreen.

11. The method of claim 9, wherein the stroke path is recognized by a drawing application via a touchscreen.

12. The method of claim 9 further comprising:

determining that a second stroke path is initiated when the template is not to be used to draw precise strokes; and drawing a second line that aligns with the second stroke path.

13. The method of claim 9 further comprising:

determining that a second stroke path is initiated at a second location positioned at another distance from the template configured to facilitate the drawing of precise strokes, wherein the second location is within a proximity of the template;

identifying a second edge of the template that is nearest the location at which the second stroke path is initiated; and automatically drawing a second line over the identified second edge of the template as the second stroke path is detected irrespective of whether the stroke path coincides with the edge of the template.

14. One or more non-transitory computer storage media storing computer-useable instructions that, when used by one or more computing devices, cause the one or more computing devices to perform operations comprising:

positioning a first electronic template presented on a background in accordance with at least one user interaction with a touchscreen, wherein positioning the first electronic template is based at least on a user contact with at least one touch point presented on a user interface via the touchscreen, wherein the at least one touch point corresponds to the presented first electronic template;

upon a second user contact with one of the at least one touch point, replacing the positioned first electronic template with a second electronic template that is of a different shape from the first electronic template;

detecting a touch path that traverses at least a portion of the touchscreen; and drawing a stroke on the user interface:

alongside an edge of the second electronic template based on a determination that the touch path falls within a predetermined distance on the touchscreen from the edge, and over the detected touch path based on a determination that the detected touch path exceeds the predetermined distance from the edge.

15. The one or more non-transitory computer storage media of claim 14, wherein the first electronic template is translated based on a determination that one of the at least one touch point presented on the user interface is contacted and moved by a user.

16. The one or more non-transitory computer storage media of claim 14, wherein the first electronic template is rotated based on a determination that two of the at least one touch point presented on the user interface is contacted and moved by a user.

17. The one or more non-transitory computer storage media of claim 14 further comprising determining the edge of the second electronic template from among a plurality of template edges over which to draw the stroke.

18. The one or more non-transitory computer storage media of claim 17, wherein the determination of the edge of the second electronic template over which to draw the stroke is based on a nearest edge to at least a portion of the touch path.

19. The one or more non-transitory computer storage media of claim 1, wherein drawing the stroke over the detected touch path comprises applying a free-form stroke.

20. The one or more non-transitory computer storage media of claim 1, wherein drawing a stroke on the user interface comprises:

drawing a portion of the stroke alongside the edge of the second electronic template based on a determination that a corresponding first portion of the touch path falls within the predetermined distance on the touchscreen from the edge, and drawing another portion of the stroke over the detected touch path based on a determination that a corresponding second portion of the detected touch path exceeds the predetermined distance from the edge.

* * * * *